US012623361B2

(12) United States Patent (10) Patent No.: US 12,623,361 B2
Robinson (45) Date of Patent: May 12, 2026

(54) GRIPPER HEAD APPARATUS FOR TRANSPORTING COMPONENTS

(71) Applicant: The Gillette Company LLC, Boston, MA (US)

(72) Inventor: Mark Knight Robinson, Frensham (GB)

(73) Assignee: The Gillette Company LLC, Boston, MA (US)

( * ) Notice: Subject to any disclaimer, the term of this patent is extended or adjusted under 35 U.S.C. 154(b) by 796 days.

(21) Appl. No.: 17/984,530

(22) Filed: Nov. 10, 2022

(65) Prior Publication Data

US 2024/0157581 A1 May 16, 2024

(51) Int. Cl.
  *B25J 15/06* (2006.01)
  *B25J 15/00* (2006.01)
(52) U.S. Cl.
  CPC ....... *B25J 15/0616* (2013.01); *B25J 15/0052* (2013.01)
(58) Field of Classification Search
  CPC .......................... B25J 15/0616; B25J 15/0052
  USPC ......................................................... 294/188
  See application file for complete search history.

(56) References Cited

U.S. PATENT DOCUMENTS 6,074,164 A * 6/2000 Spencer ............... B25J 15/0616
                                                            294/185
8,714,903 B2 * 5/2014 Feng .................... B25J 15/0616
                                                            414/735

10,864,555 B2 * 12/2020 McCoy, Jr. .......... B25J 15/0616
11,059,075 B2 * 7/2021 McCoy, Jr. ........... B07C 5/3422
11,254,013 B2 * 2/2022 Safeldt ................. B25J 15/0625
11,465,858 B2 10/2022 Douglas
(Continued)

FOREIGN PATENT DOCUMENTS

AU     2018336878 A1   2/2020
AU     2020323521 A1   3/2022
(Continued)

OTHER PUBLICATIONS

EPO Search Report and Opinion for Application No. 23203700.2; dated Apr. 19, 2024, 06 pages.
(Continued)

*Primary Examiner* — Gene O Crawford
*Assistant Examiner* — Rehman A Qureshi
(74) *Attorney, Agent, or Firm* — John M. Lipchitz

(57) ABSTRACT

A gripping apparatus is provided for transporting components from one location to another. The gripping apparatus includes a body defining a chamber and an exhaust at a first end of the body. The apparatus also includes a gripper head configured to be attached to a second end of the body opposite to the first end. The gripper head defines one or more openings and a nest having a profile configured to locate and releasably hold a component based on an air flow generated within the chamber and discharged through the exhaust. The apparatus also includes an air conveyor positioned within the chamber. The air conveyor is configured to generate the air flow through an inlet and out through the exhaust. The air conveyor defines a central bore and an exhaust port. The inlet includes an inlet port with a nozzle in communication with the central bore and the exhaust port.

20 Claims, 13 Drawing Sheets

(56)  References Cited

U.S. PATENT DOCUMENTS

| | | | | |
|---|---|---|---|---|
| 11,753,257 | B2 * | 9/2023 | Douglas | B07C 5/342 |
| | | | | 700/223 |
| 2016/0089792 | A1 | 3/2016 | Ojalehto | |
| 2017/0197346 | A1 | 7/2017 | Song et al. | |
| 2019/0084012 | A1 * | 3/2019 | McCoy, Jr. | B25J 15/0616 |
| 2020/0191193 | A1 | 6/2020 | Schulnig et al. | |
| 2020/0398492 | A1 | 12/2020 | Corkum | |
| 2021/0122065 | A1 | 4/2021 | Pang et al. | |
| 2021/0179366 | A1 * | 6/2021 | McCoy, Jr. | B65G 47/918 |
| 2022/0266458 | A1 | 8/2022 | Fofonoff | |
| 2023/0271337 | A1 | 8/2023 | Brinckmann | |
| 2023/0286173 | A1 | 9/2023 | Bouvais | |
| 2024/0051156 | A1 | 2/2024 | Sheikholeslami et al. | |

FOREIGN PATENT DOCUMENTS

| | | | |
|---|---|---|---|
| CA | 3097808 | A1 | 11/2019 |
| SE | 2030211 | A1 | 12/2021 |
| WO | 2021021807 | A1 | 2/2021 |
| WO | 2022216235 | A1 | 10/2022 |

OTHER PUBLICATIONS

PHD Robotic Solution Modular Gripper Heads, Retrieved from Internet: https://www.phdinc.com/pdf/CPURGRIPPERSA.pdf, 2014, 2 pages.

* cited by examiner

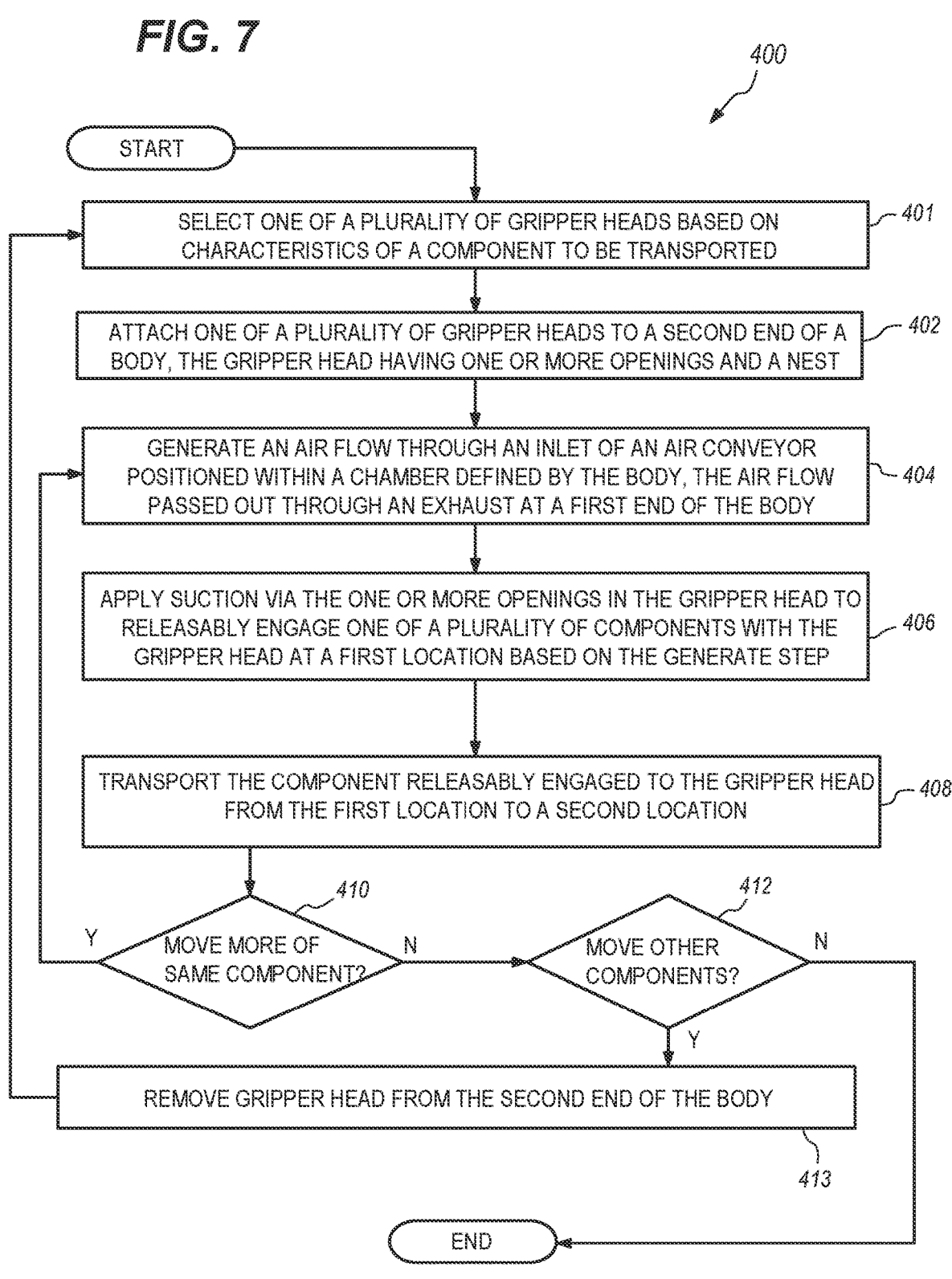

START

SELECT ONE OF A PLURALITY OF GRIPPER HEADS BASED ON CHARACTERISTICS OF A COMPONENT TO BE TRANSPORTED — 401

ATTACH ONE OF A PLURALITY OF GRIPPER HEADS TO A SECOND END OF A BODY, THE GRIPPER HEAD HAVING ONE OR MORE OPENINGS AND A NEST — 402

GENERATE AN AIR FLOW THROUGH AN INLET OF AN AIR CONVEYOR POSITIONED WITHIN A CHAMBER DEFINED BY THE BODY, THE AIR FLOW PASSED OUT THROUGH AN EXHAUST AT A FIRST END OF THE BODY — 404

APPLY SUCTION VIA THE ONE OR MORE OPENINGS IN THE GRIPPER HEAD TO RELEASABLY ENGAGE ONE OF A PLURALITY OF COMPONENTS WITH THE GRIPPER HEAD AT A FIRST LOCATION BASED ON THE GENERATE STEP — 406

TRANSPORT THE COMPONENT RELEASABLY ENGAGED TO THE GRIPPER HEAD FROM THE FIRST LOCATION TO A SECOND LOCATION — 408

Y ← MOVE MORE OF SAME COMPONENT? — 410 → N

MOVE OTHER COMPONENTS? — 412 → N

Y

REMOVE GRIPPER HEAD FROM THE SECOND END OF THE BODY — 413

END

Figure 9:
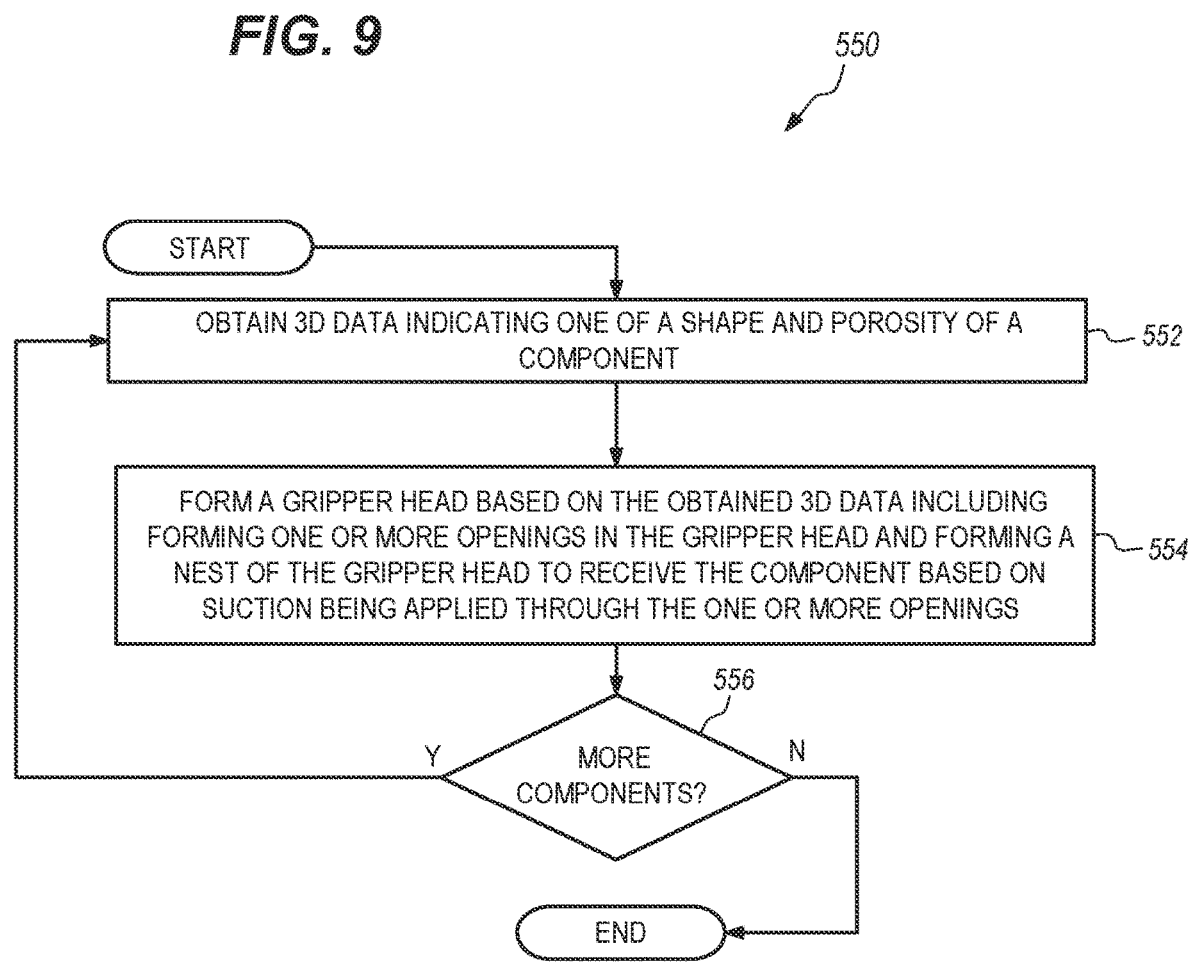

START

OBTAIN 3D DATA INDICATING ONE OF A SHAPE AND POROSITY OF A COMPONENT — 552

FORM A GRIPPER HEAD BASED ON THE OBTAINED 3D DATA INCLUDING FORMING ONE OR MORE OPENINGS IN THE GRIPPER HEAD AND FORMING A NEST OF THE GRIPPER HEAD TO RECEIVE THE COMPONENT BASED ON SUCTION BEING APPLIED THROUGH THE ONE OR MORE OPENINGS — 554

556

Y    MORE COMPONENTS?    N

END

GRIPPER HEAD APPARATUS FOR TRANSPORTING COMPONENTS

FIELD

The present disclosure relates generally to grippers used in conjunction with vacuum generators to suction components in order to transport them from one location to another.

BACKGROUND

Standard suction cups or mechanical grippers are available which are used in conjunction with vacuum generators to suction one or more components and transport them from one location to another. However, these standard suction cups require the component have a minimum surface area in order to generate the necessary suction to hold the component. Additionally, these standard suction cups only work with components capable of withstanding a threshold suction force established by the suction cup. Hence, these conventional suction cups are not suitable for transporting components that have minimal surface area and/or which are delicate and not capable of withstanding these threshold suction forces.

Additionally, in addition to a primary valve that is used to establish the vacuum suction, these standard suction cups typically feature a secondary valve to provide an ejection pulse to release the component from the suction cup after transport. Hence, by introducing these secondary valves, these conventional suction cups increase a cycle time of the unit in transporting components between locations.

These conventional suction cups also require a large suction rate that necessitates an increased weight and size of the end of an arm tooling on which the suction cup is positioned. This increased size and weight necessarily reduces the performance of the system.

SUMMARY

Various embodiments solve the above-mentioned problems and provide a gripper head apparatus for transporting components from one location to another, especially those components having a minimal surface area or are delicate such that they are not capable of withstanding threshold suction forces established by conventional suction cups. Various embodiments also provide a kit including a plurality of gripper heads to be used with the gripper head apparatus. Various embodiments also provide a method for transporting components from one location to another using the gripper head apparatus. Various embodiments also provide a method for forming multiple gripper heads for use in the method for transporting the components.

In a first set of embodiments, a gripping apparatus is provided for transporting components from one location to another. The gripping apparatus includes a body defining a chamber and an exhaust at a first end of the body. The apparatus also includes a gripper head configured to be attached to a second end of the body opposite to the first end. The gripper head defines one or more openings and a nest having a profile configured to locate and releasably hold a component based on an air flow generated within the chamber and discharged through the exhaust. The apparatus also includes an air conveyor positioned within the chamber. The air conveyor is configured to generate the air flow through an inlet and out through the exhaust. The air conveyor defines a central bore and an exhaust port. The inlet includes an inlet port with a nozzle in communication with the central bore and the exhaust port.

In a second set of embodiments, a kit is provided for a gripping apparatus. The gripping apparatus includes a body defining a chamber and an exhaust at a first end of the body. The gripping apparatus also includes an air conveyor positioned within the chamber. The air conveyor is configured to generate an air flow through an inlet and out through the exhaust. The kit includes a plurality of gripper heads each configured to be attached to a second end of the body opposite to the first end. Each gripper head defines a respective interchangeable nest that is different among the plurality of gripper heads. Each gripper head is configured to locate and releasably hold one of a plurality of components based on the air flow generated within the chamber and discharged through the exhaust.

In a third set of embodiments, a method is provided for transporting components from a first location to a second location using a gripping apparatus. The gripping apparatus includes a body defining a chamber and includes an exhaust at a first end of the body. The gripping apparatus also includes an air conveyor positioned within the chamber. The method includes attaching one of a plurality of gripper heads to a second end of the body opposite to the first end. The gripper head defines one or more openings and a nest. The method further includes generating an air flow through an inlet of the air conveyor and out through the exhaust. The method further includes applying suction via the one or more openings in the gripper head to locate and releasably hold one of the plurality of components with the gripper head at the first location based on the generating step. The method further includes transporting the component releasably held to the gripper head from the first location to a second location.

In a fourth set of embodiments, a method is provided for forming one or more gripper heads to be used with a gripping apparatus. The method includes obtaining 3D data based on a geometry of a component. The method also includes forming one gripper head comprising 3D printing the gripper head based on the obtained 3D data. The forming step includes forming one or more openings in the gripper head and forming a nest of the gripper head to locate and releasably hold the component based on suction being applied through the one or more openings.

BRIEF DESCRIPTION OF THE DRAWINGS

Many aspects of this disclosure can be better understood with reference to the following figures.

FIG. 6 is an example according to various embodiments illustrating a kit for a gripping apparatus including multiple gripper heads used to transport multiple components from a first location to a second location.

FIG. 7 is an example according to various embodiments illustrating a flowchart of a method for transporting one or more components using one or more gripper heads of the kit of FIG. 6.

FIG. 9 is an example according to various embodiments illustrating a flowchart of a method for forming the one or more gripper heads using the system of FIG. 8.

Figure 1A:
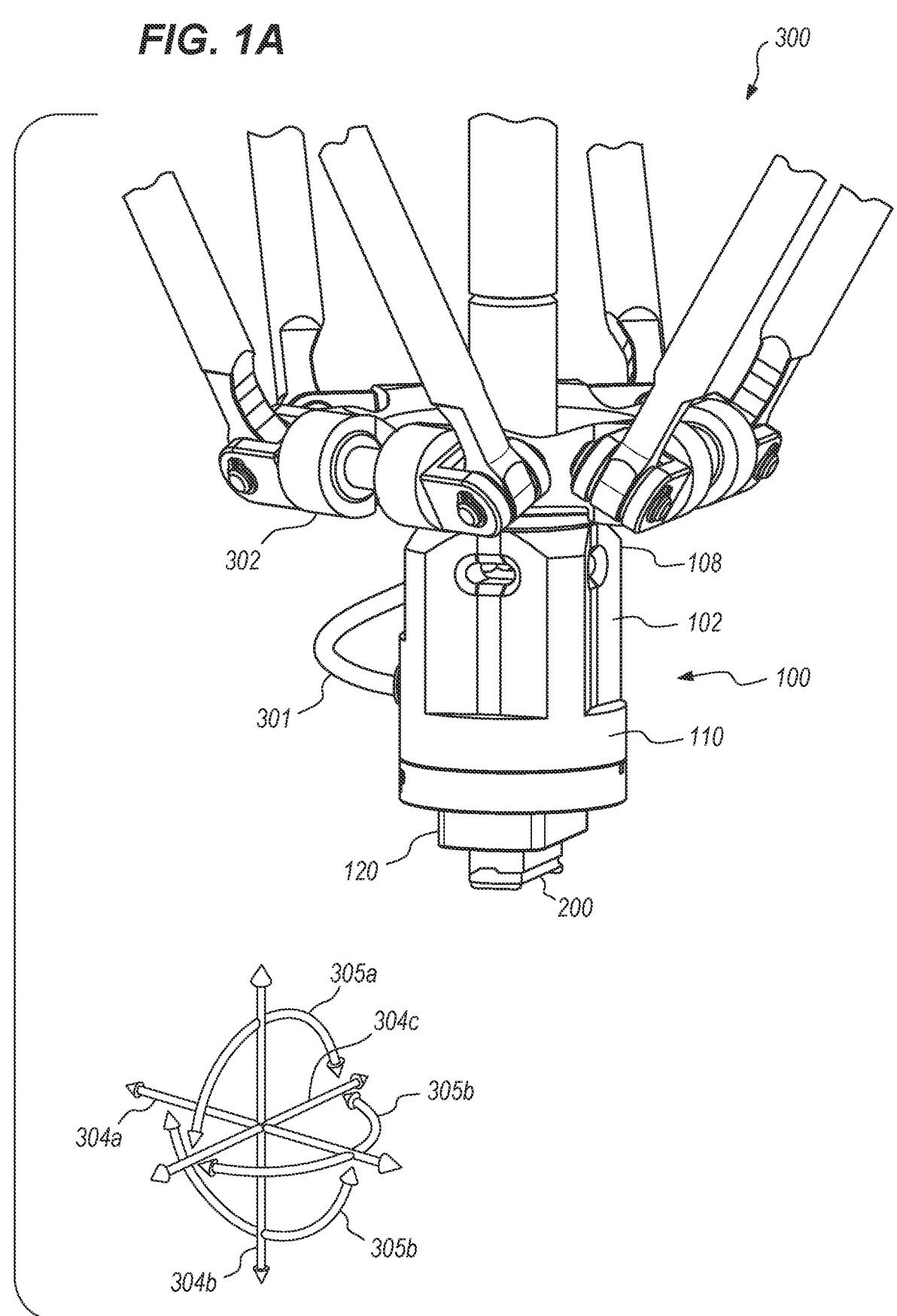
FIG. 1A is an example according to various embodiments illustrating a side perspective view of an automated system that is used to move a gripper head apparatus in one or more directions.

It should be understood that the various embodiments are not limited to the examples illustrated in the figures.

DETAILED DESCRIPTION

Introduction and Definitions

This disclosure is written to describe the invention to a person having ordinary skill in the art, who will understand that this disclosure is not limited to the specific examples or embodiments described. The examples and embodiments are single instances of the invention which will make a much larger scope apparent to the person having ordinary skill in the art. Unless defined otherwise, all technical and scientific terms used herein have the same meaning as commonly understood by the person having ordinary skill in the art. It is also to be understood that the terminology used herein is for the purpose of describing examples and embodiments only, and is not intended to be limiting, since the scope of the present disclosure will be limited only by the appended claims.

All the features disclosed in this specification (including any accompanying claims, abstract, and drawings) may be replaced by alternative features serving the same, equivalent, or similar purpose, unless expressly stated otherwise. Thus, unless expressly stated otherwise, each feature disclosed is one example only of a generic series of equivalent or similar features. The examples and embodiments described herein are for illustrative purposes only and that various modifications or changes in light thereof will be suggested to the person having ordinary skill in the art and are to be included within the spirit and purview of this application. Many variations and modifications may be made to the embodiments of the disclosure without departing substantially from the spirit and principles of the disclosure. All such modifications and variations are intended to be included herein within the scope of this disclosure. For example, unless otherwise indicated, the present disclosure is not limited to particular materials, reagents, reaction materials, manufacturing processes, or the like, as such can vary. It is also to be understood that the terminology used herein is for purposes of describing particular embodiments only and is not intended to be limiting. It is also possible in the present disclosure that steps can be executed in different sequence where this is logically possible.

All numeric values are herein assumed to be modified by the term "about," whether or not explicitly indicated. The term "about" generally refers to a range of numbers that one of skill in the art would consider equivalent to the recited value (for example, having the same function or result). In many instances, the term "about" may include numbers that are rounded to the nearest significant figure.

In everyday usage, indefinite articles (like "a" or "an") precede countable nouns and noncountable nouns almost never take indefinite articles. It must be noted, therefore, that, as used in this specification and in the claims that follow, the singular forms "a," "an," and "the" include plural referents unless the context clearly dictates otherwise. Thus, for example, reference to "a support" includes a plurality of supports. Particularly when a single countable noun is listed as an element in a claim, this specification will generally use a phrase such as "a single." For example, "a single support."

Where a range of values is provided, it is understood that each intervening value, to the tenth of the unit of the lower limit (unless the context clearly dictates otherwise), between the upper and lower limit of that range, and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

In this specification and in the claims that follow, reference will be made to a number of terms that shall be defined to have the following meanings unless a contrary intention is apparent.

Automated System

FIG. 1A is an example according to various embodiments illustrating a side perspective view of an automated system 300 that is used to move a component 200 removably held by a gripping apparatus 100 in one or more directions. Components may include any small discrete parts that need to move from one area to another for further assembly or finishing operations. For example, components may include shaving razor components such as shaving cartridge housings, shaving razor connectors, shaving razor cartridge dispensers. In yet another example, components can have high surface complexity but are lightweight (e.g., less than or greater than about 5 grams) depending on the surface area. However, it is understood that components are not limited to shaving razor cartridges. In an embodiment, the gripping apparatus 100 includes a body 102 with a first end 108 that is attached to a component 302 of the automated system 300. In one embodiment, the component 200 is removably held by a gripper head 120 secured to a second end 110 of the body 120 that is opposite to the first end 108. In some embodiments, the component 200 is removably held by the gripper head 120 using an airflow supplied to the body 102 through a hose 301. In one embodiment, the component 302 of the automated system 300 is configured to move in one or more directions. In an example embodiment, the component 302 is a pick and place device that is configured to move in one or two dimensions. As shown in FIG. 1A, the component 302 is configured to move in a plurality of directions (e.g. up to six directions) including along one or more axes 304a, 304b, 304c and/or in one or more rotational directions 305a, 305b, 305c about the respective axes 304a, 304b, 304c. In yet another example embodiment, the automated system 300 is a robotic system and the position of the component 302 is automatically adjusted by a controller (not shown).

Figure 1B:
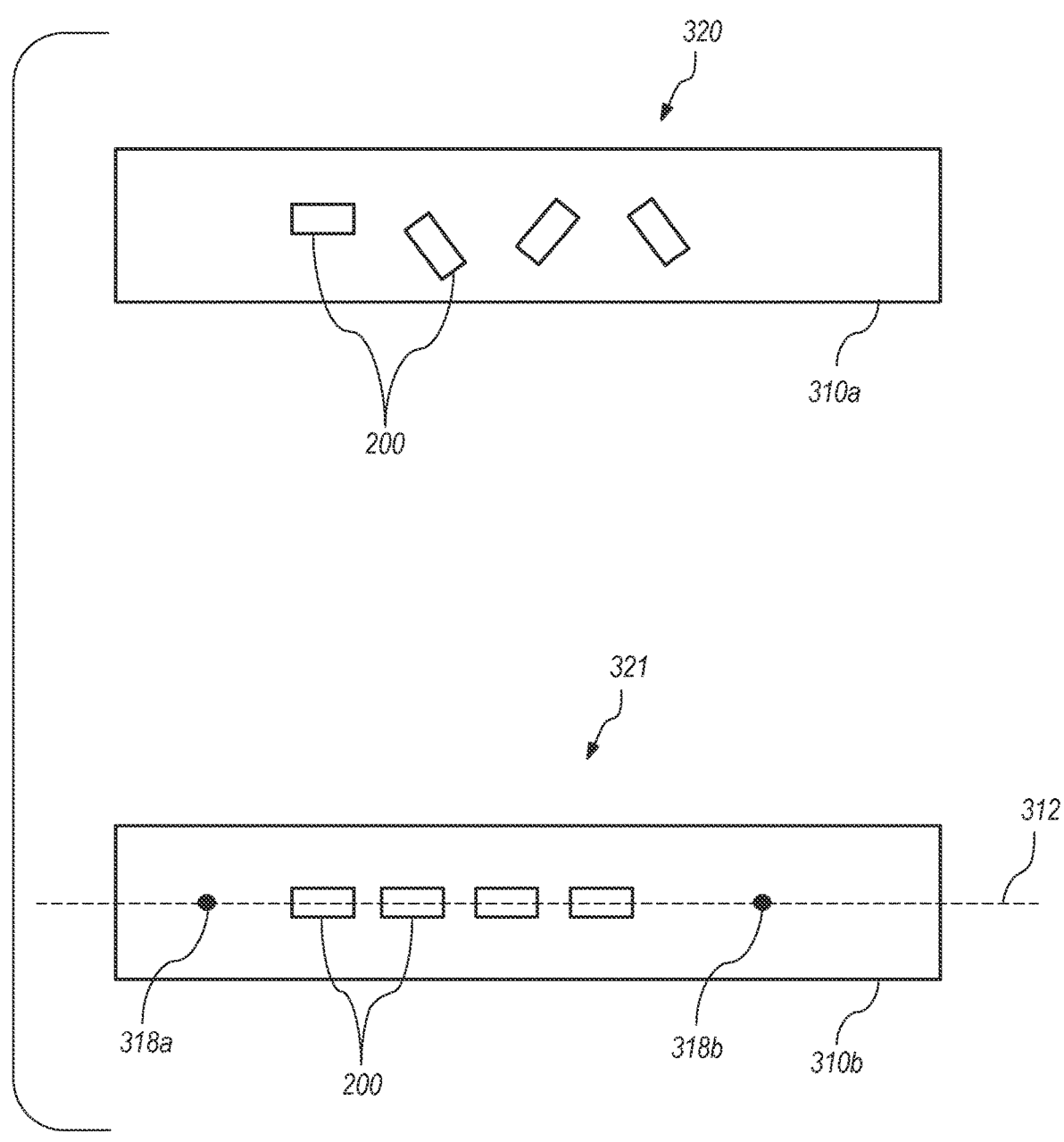
FIG. 1B is an example according to various embodiments illustrating a top view of components being moved from a first location to a second location with the automated system of FIG. 1A.

FIG. 1B is an example according to various embodiments illustrating a top view of components 200 being moved from a first location to a second location with the automated system 300 of FIG. 1A. In one embodiment, the first location is a first conveyor line 310a and the second location is a second conveyor line 310b. In these embodiments, the component 302 and the gripping apparatus 100 are configured to move the components 200 from the first conveyor line 310a to the second conveyor line 310b. As shown in FIG. 1B, in some embodiments in addition to moving the components 200 from the first conveyor line 310a to the second conveyor line 310b the component 302 and the gripping apparatus 100 are configured to rearrange the components 200 as they are placed on the second conveyor line 310b. In an example embodiment, the component 302 and the gripping apparatus 100 are configured to move the components 200 from a random arrangement 320 on the first conveyor line 310 to an ordered arrangement 321 (e.g. aligned with an axis 312 along the second conveyor line 310b) on the second conveyor line 310b. Additionally, as shown in FIG. 1B the second conveyor line 310b includes one or more calibration locations 318a, 318b (whose location is known). As appreciated by one of ordinary skill in the art, the automated system 300 is calibrated by moving the component 302 to each of the one or more calibration locations 318a, 318b and recording a position of the component 302 at each calibration location 318a, 318b in a memory of the controller. These stored locations are then used by the automated system 300 to determine other locations on the second conveyor line 310b (e.g. other points along the axis 312).

Gripping Apparatus

Figure 2:
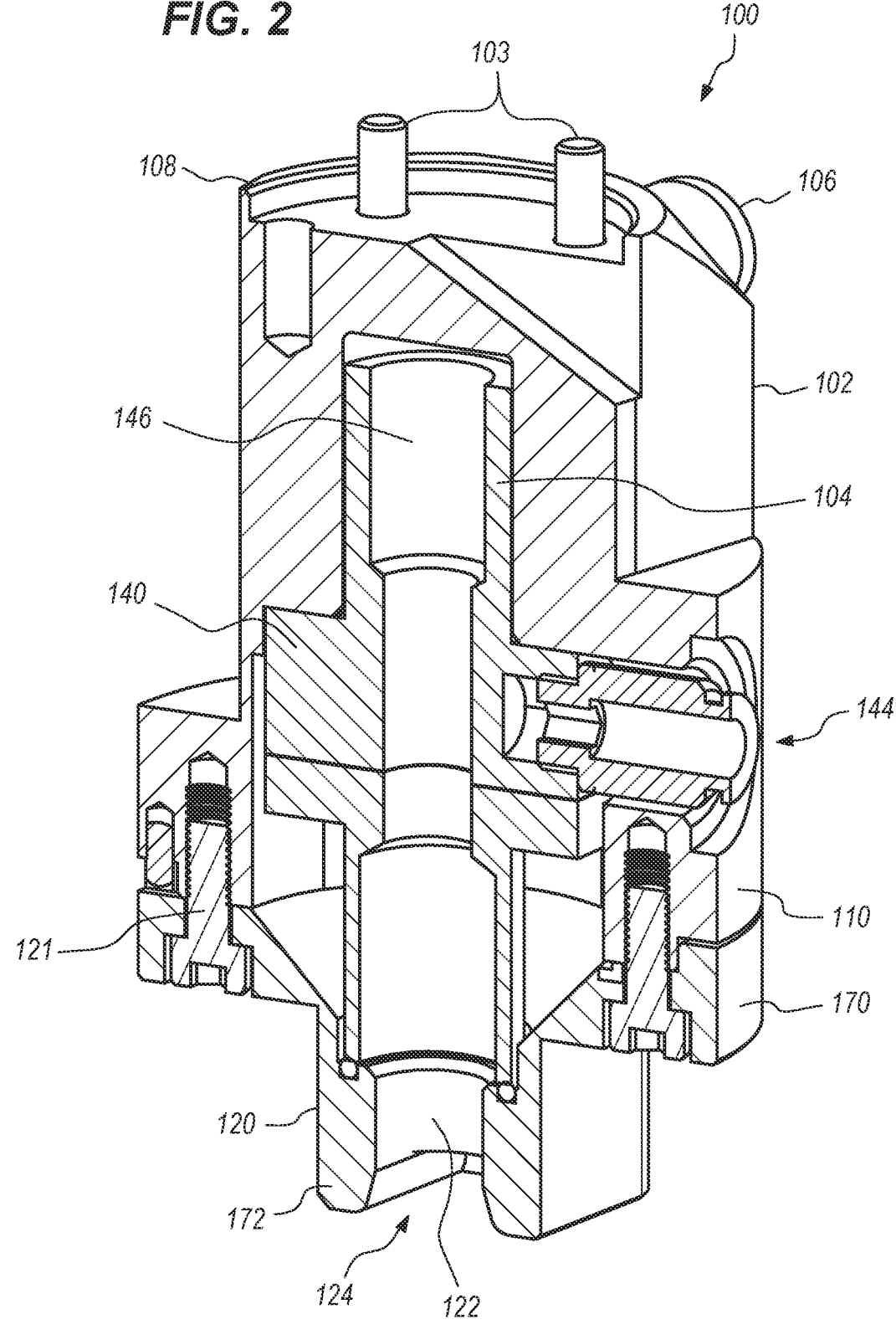
FIG. 2 is an example according to various embodiments illustrating a sectional perspective view of a gripping apparatus including a gripper head to releasably hold a component.

The gripping apparatus 100 that was discussed with reference to FIG. 1A will now be described in more detail. FIG. 2 is an example according to various embodiments illustrating a sectional perspective view of the gripping apparatus 100 including the gripper head 120 that is used to releasably hold the component 200. In some embodiments, the gripping apparatus 100 is similar to the apparatus 100 depicted in FIG. 1A and includes bolts 103 provided at the first end 108 of the body 102 which are used to secure the body 102 to the component 302 of the automated system 300.

In an embodiment, the gripping apparatus 100 includes the body 102 that defines a chamber 104 and includes an exhaust 106 at the first end 108 of the body 102. The gripper head 120 is attached to the second end 110 of the body 102 that is opposite to the first end 108. In some embodiments, the second end 110 of the body 102 is removably attached to the gripper head 120 using one or more bolts 121 (e.g., that pass through aligned openings in the gripper head 120 and the body 102). As shown in FIG. 2, in some embodiments the bolts 121 are used to secure a first end 170 of the gripper head 120 to the second end 110. Although FIG. 2 depicts that bolts 121 are used to removably attach the gripper head 120 to the second end 110 of the body 102, any other means appreciated by one of ordinary skill in the art can be used to secure the gripper head 120 to the second end 110 (e.g. clips, magnets and/or an air vacuum).

As shown in FIG. 2, a second end 172 of the gripper head 120 that is opposite from the first end 170 defines an opening 122 and a nest 124 with a profile configured to locate and releasably hold the component 200 based on an air flow generated within the chamber 104 and discharged through the exhaust 106. Although a single opening 122 is depicted in the gripper head 120 of FIG. 2, in other embodiments the gripper head 120 features multiple openings. In one example embodiment, the nest 124 is rigid. In another example embodiment, the opening 122 and the nest 124 are configured such that the component 200 is held by the gripper head 120 at a maximum velocity or maximum inertia at which the automated system 300 operates. In this example embodiment, the design of the gripper head 120 advantageously ensures that the component 200 is not dropped by the gripper head 120 as it is transported from the first location (e.g. the conveyor line 310a) to the second location (e.g. conveyor line 310b) by the automated system 300.

Additionally, in an embodiment, the gripping apparatus 100 includes an air conveyor 140 positioned within the chamber 104. The air conveyor 140 generates the air flow through an inlet 144 and out through the exhaust 106. As previously discussed, in some embodiments the air flow is provided to the inlet 144 via the hose 301 that is connected to a compressed air source (not shown) of the automated system 300. As shown in FIG. 2, in one embodiment, the body 102 securely surrounds and encases the air conveyor 140 within the chamber 104.

Figure 3A:
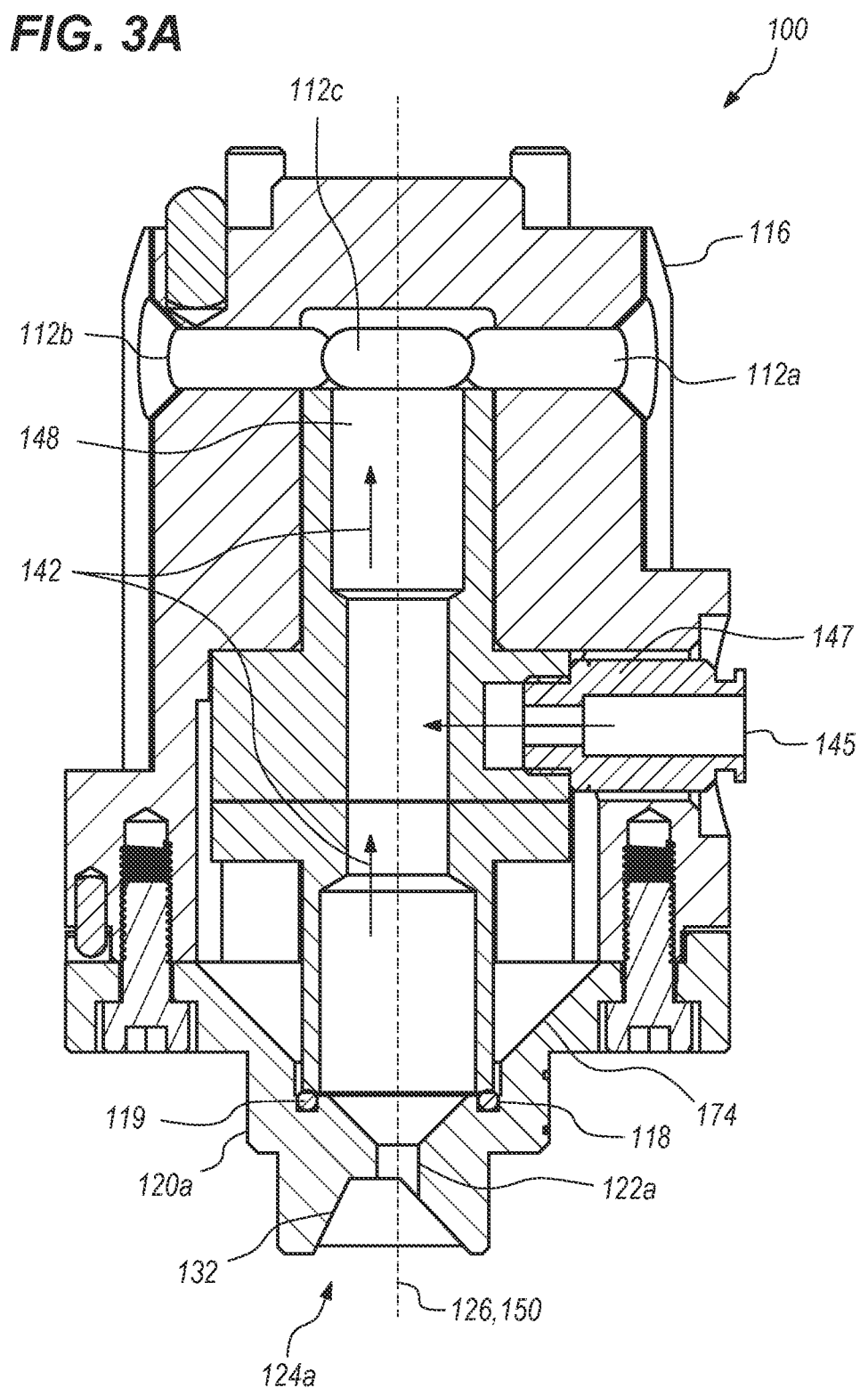
FIG. 3A is an example according to various embodiments illustrating a cross-sectional side view of a gripping apparatus including a gripper head to releasably hold a component.

FIG. 3A is an example according to various embodiments illustrating a cross-sectional side view of the gripping apparatus 100 including a gripper head 120a to releasably hold a component 200a. As shown in FIG. 3A, the nest 124 has a profile configured to locate and releasably hold the component 200a based on an air flow 142 generated within the chamber 104 and discharged through the exhaust 106. The air conveyor 140 defines a central bore 146 and an exhaust port 148. The inlet 144 includes an inlet port 145 with a nozzle 147 in communication with the central bore 146 and the exhaust port 148. As shown in FIG. 3A, in one embodiment the nozzle 147 and the inlet port 145 are oriented at a non-zero angle (e.g. orthogonal angle) to a longitudinal axis 150 of the air conveyor 140 defined by the central bore 146. As further shown in FIG. 3A, in an embodiment the exhaust port 148 of the air conveyor 140 is positioned at one end of the chamber 104 that is adjacent to the first end 108 of the body 102. Based on this arrangement, the exhaust 106 at the first end 108 of the body 102 is in communication with the exhaust port 148 and the central bore 146 of the air conveyor 140. Additionally, due to this arrangement, the air flow 142 generated within the central bore 146 is discharged through the exhaust 106 at the first end 108 of the body 102. FIG. 3A further depicts that in one embodiment the exhaust 106 at the first end 108 of the body 102 defines a plurality of exhaust openings 112a through 112d. As further shown in FIG. 3A the plurality of exhaust openings 112a through 112d are spaced apart along an outer surface 116 of the first end 108 of the body 102 such that the generated air flow 142 is dissipated through the plurality of exhaust openings 112a through 112d. In an example embodiment, where four exhaust openings 112a through 112d are provided, the exhaust openings are angularly spaced apart by about 90 degrees.

As shown in FIG. 3A, in an embodiment the gripper head 120a is secured to the second end 110 of the body 102 with an O-ring 119 that forms a vacuum seal between the gripper head 120a and the second end 110 of the body 102. In one embodiment, the gripper head 120a defines a recess 118 that is sized and shaped to receive the O-ring 119 in order to form the vacuum seal between the gripper head 120a and the second end 110 of the body 102 when the O-ring 119 is positioned in the recess 118 and the bolts 121 are secured through openings in both the gripper head 120a and the second end 110 of the body 102. Although an O-ring 119 is depicted in FIG. 3A, in other embodiments any means can be used to form a vacuum seal between the gripper head 120a and the second end 110 of the body 102. Additionally, as shown in FIG. 3A in one embodiment the gripper head 120a defines an inner conical surface 174 over which the recess 118 is formed.

First Gripper Head Design

Figure 3B:
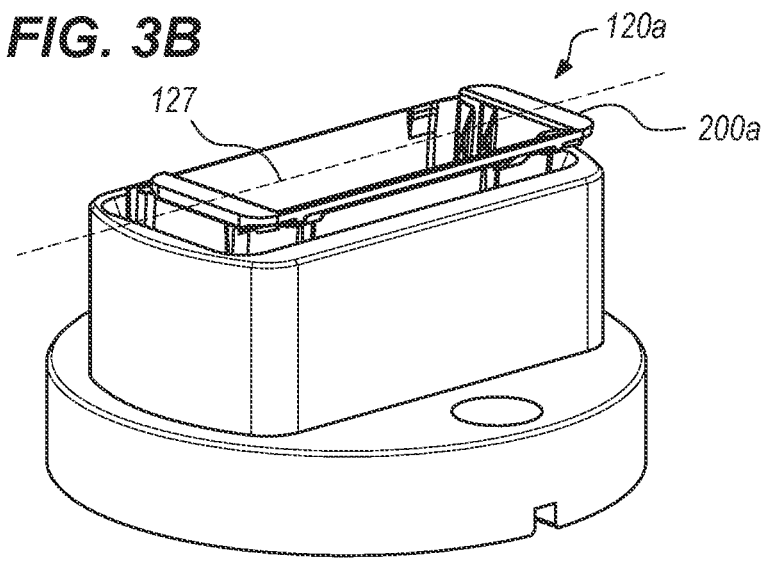
FIGS. 3B through 3D is an example according to various embodiments illustrating perspective views of the gripper head of FIG. 3A to releasably hold the component.
Figure 3C:
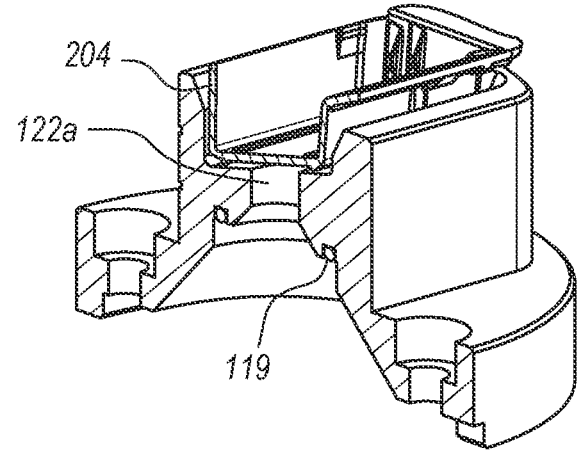
Figure 3D:
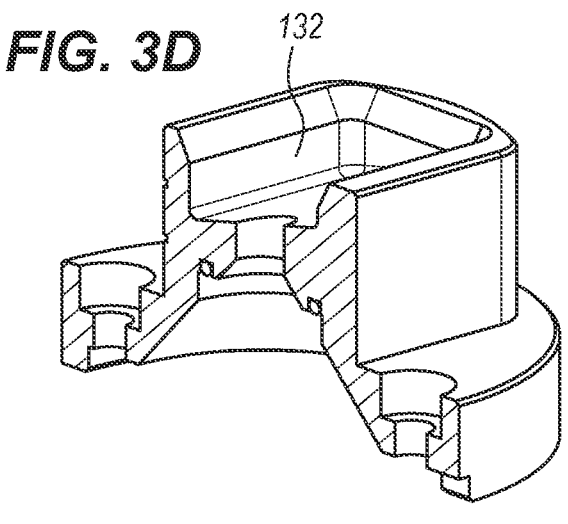

A first embodiment of the gripper head 120a and associated component 200a located and releasably held by the gripper head 120a will now be discussed and is depicted in FIGS. 3B through 3D. In an embodiment, the component 200a may include a shaving razor cartridge cover configured to hold a shaving razor cartridge.

FIGS. 3B through 3D is an example according to various embodiments illustrating perspective views of the gripper head 120a of FIG. 3A that is used to releasably hold the component 200a. As shown in FIG. 3A, in one embodiment the gripper head 120a defines a single opening 122a that is parallel to a longitudinal axis 126 of the gripper head 120a. The single opening 122a and the nest 124a are configured to locate and releasably hold the component 200a based on the generated air flow 142. In an example embodiment, a width of the single opening 122a is non-tapered over the gripper head 120a. (FIG. 2B, FIGS. 3A-3C). In another example embodiment, the single opening 122a is circular in shape.

As shown in FIGS. 3A and 3D, in an embodiment the nest 124a of the gripper head 120a defines a profiled pocket 132 in communication with the single opening 122a. The profile pocket 132 is configured to receive a portion 204 of the component 200a releasably engaged by the gripper head 120a. As shown in FIG. 3B, in some embodiments the profile pocket 132 is elongated along a transverse axis 127 that is orthogonal to the longitudinal axis 126 of the gripper head 120a. In an example embodiment, the profile pocket 132 is shaped based on a shape of the portion 204 of the component 200a that is received within the profile pocket 132. In this example embodiment, an inner length and/or an inner width of the profile pocket 132 is based on a corresponding outer length and/or outer width of the portion 204 (e.g. the inner length and/or width of the profile pocket 132 is slightly larger so that the portion 204 fits within the profile pocket 132).

The gripper head 120a was designed based on features of the component 200a. As previously discussed, in one embodiment the dimensions and shape of the profile pocket 132 are based on corresponding dimensions and shape of the portion 204 of the component 200a to be received in the profile pocket 132. The shaping of the profile pocket 132 may advantageously assist the gripper head 120a to locate and receive the component 200a in the profile pocket 132. Additionally, in another embodiment, the component 200a may not have openings (e.g., is solid throughout). Accordingly, the single opening 122a in the gripper head 120a may be positioned toward a center of the component 200a that is received in the profile pocket 132 to achieve a relatively equal distribution of suction force on the component 200a when the air flow 142 is generated in the body 102. Accordingly, the position of the opening 122a may be designed based on the specific geometry of the component 200a to be picked up and moved (e.g., shape and location of any voids in the component 200 that make holding the component difficult).

Second Gripper Head Design

A second embodiment of a gripper head 120b and associated component 200b located and removably held by the gripper head 120b will now be discussed and are depicted in FIGS. 4A through 4D. In an embodiment, the component 200b may include a shaving razor cartridge housing.

Figure 4A:
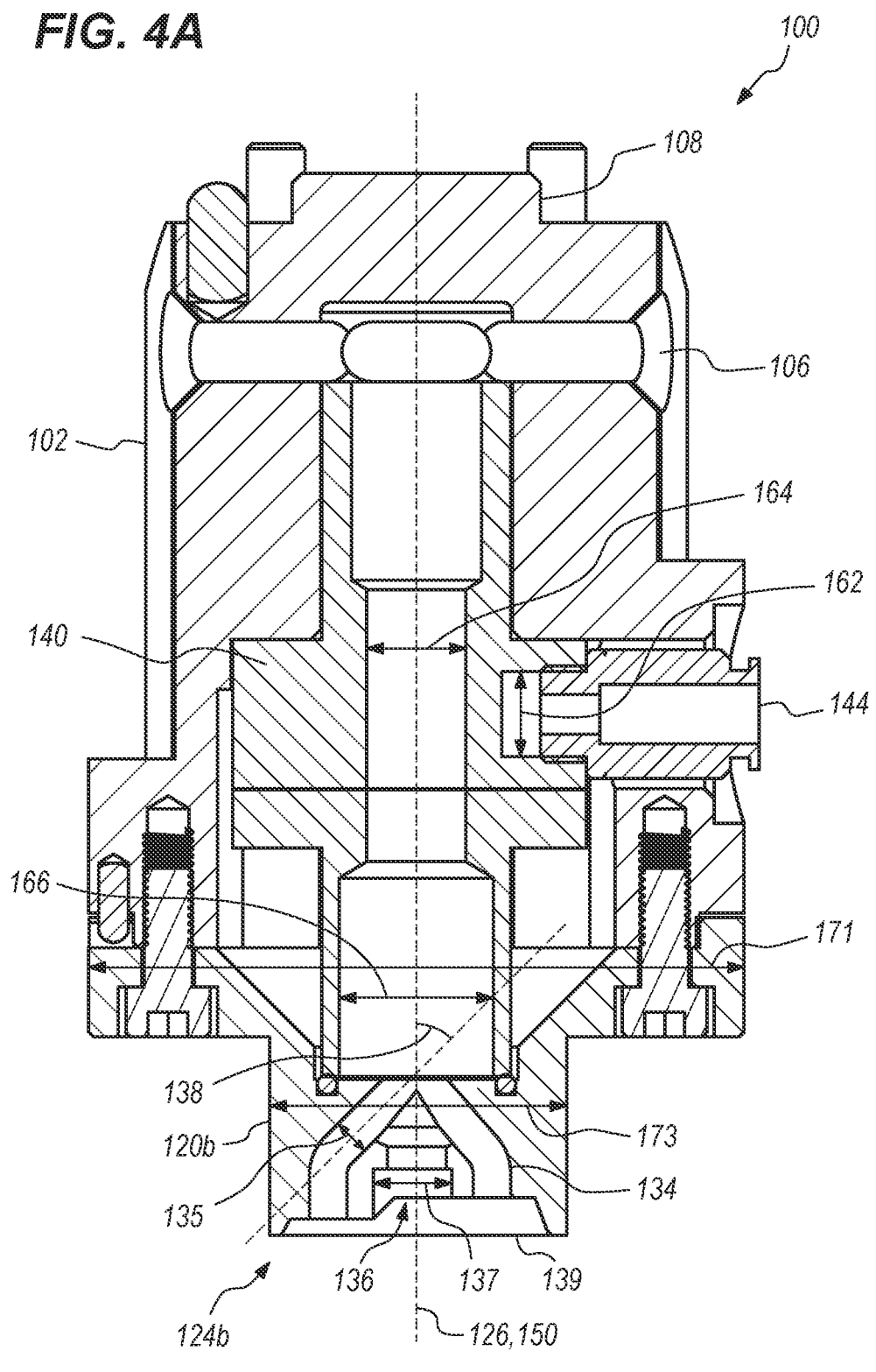
FIG. 4A is an example according to various embodiments illustrating a cross-sectional side view of a gripping apparatus including a gripper head to releasably hold a component.

FIG. 4A is an example according to various embodiments illustrating a cross-sectional side view of the gripping apparatus 100 including a gripper head 120b to releasably hold a component 200b. With respect to the gripping apparatus 100, FIG. 4A depicts that the nozzle 147 has a diameter 162 that is less than a diameter 164 of the central bore 146. The transition from the nozzle 147 to the central bore 146 is a venturi transition since the air flow 142 experiences a diameter transition from the nozzle 147 to the central bore 146. Also as shown in FIG. 4A, the central bore 146 has a diameter 166 adjacent a second end 110 of the body 102 that reduces to the diameter 164 adjacent a central portion of the central bore 146 and thus the air flow 142 passing from the bottom of the central bore 146 to central portion of the central bore 146 also experiences a venturi transition. As further shown in FIG. 4A, in an embodiment the body 102 has an outer diameter 171 at the second end 110 that is greater than an outer diameter 173 of the gripper head 120 at a second end 172 where the nest 124 is formed. It was recognized that the outer diameter 173 should be sufficiently large in order to encompass the component 200 to be located and removably held by the nest 124 of the gripper head 120.

As shown in FIG. 4A, in an embodiment the gripper head 120b defines one or more openings that are different from the single opening 122a in the gripper head 120a. Additionally, in this embodiment the gripper head 120b defines a nest 124b which is different from the nest 124a of the gripper head 120a. In these embodiments the gripper head 120b has a different set of openings and nest since the gripper head 120b is configured to locate and releasably hold a component 200b with different characteristics from the component 200a located and releasably held by the gripper head 120a. In these embodiments, the gripper head 120b defines angled openings 134 that are angled relative to a longitudinal axis 126 of the gripper head 120b. In this embodiment, the angled openings 134 form an angle 138 with the longitudinal axis 126. In an example embodiment, the angle 138 is in a range from 30 degrees to 60 degrees. In one embodiment, no specific value of the angle 138 is necessary since the angle 138 is for merging the paths of the air flow through the single opening 136 and the angled openings 134 based on a location of suction to be applied to the component 200b. In other embodiments, the value of the angle 138 is determined based on a clearance that is required for the automated system 300 employing the gripper head 120b to locate the component 200b within the recess 139 of the gripper head 120b. As further shown in FIG. 4A, the gripper head 120b further defines a single opening 136 that is oriented parallel to the longitudinal axis 126. In some embodiments, the angled openings 134 have a first width 135 and the single opening 136 has a second width 137 that is different from the first width 135. In one example embodiment, the first width 135 is less than the second width 137.

Figure 4B:
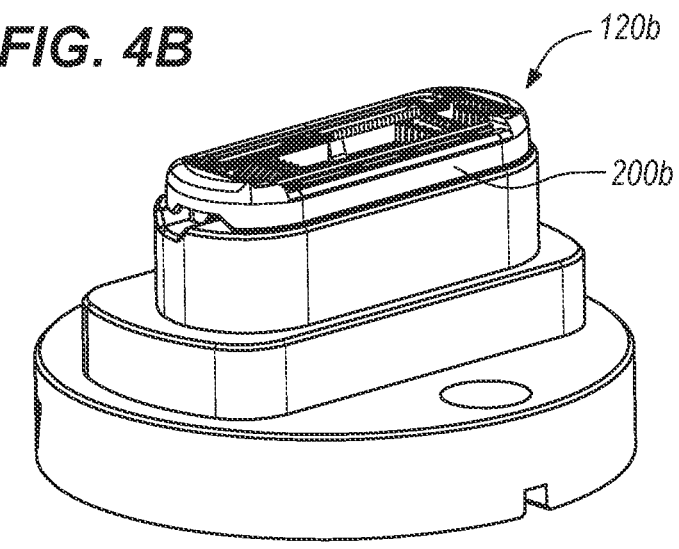
FIGS. 4B through 4D is an example according to various embodiments illustrating perspective views of the gripper head of FIG. 4A to releasably hold the component.
Figure 4C:
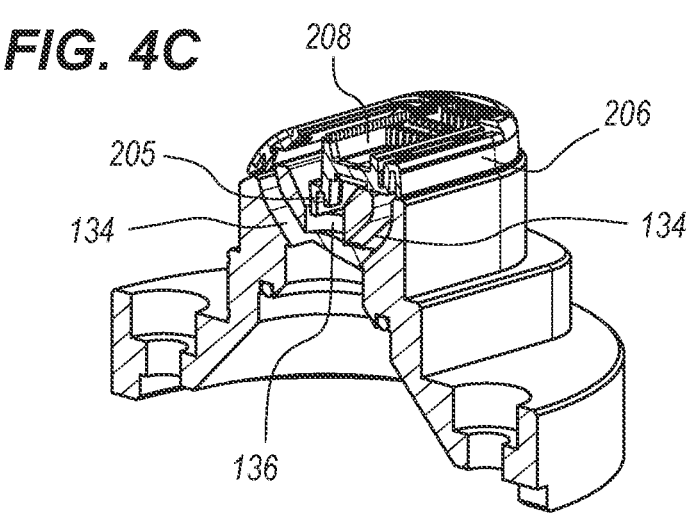
Figure 4D:
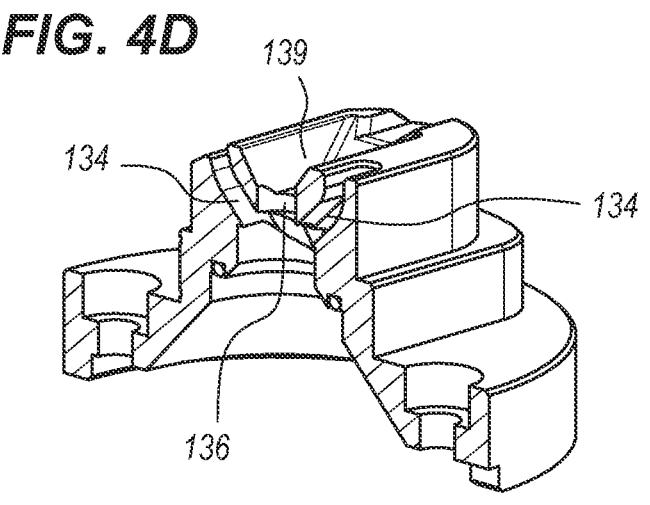

FIGS. 4B through 4D is an example according to various embodiments illustrating perspective views of the gripper head 120b of FIG. 4A to releasably hold the component 200b. As further shown in FIG. 4A, the nest 124b of the gripper head 120a defines a recess 139. FIG. 4C depicts that in some embodiments the component 200*b* includes a solid portion 206 (e.g. not porous with no openings), a portion with openings 208 and a male portion 205. In these embodiments, the recess 139 is shaped and sized to receive the male portion 205 of the component 200*b*.

As shown in FIGS. 4B and 4C, when the component 200*b* is releasably held by the gripper head 120*b* the angled openings 134 are aligned with the solid portion 206 of the component 200*b* and the single opening 136 is aligned with the openings 208 of the component 200*b*. The openings may be designed and sized to maximize force on a land (e.g., flat open space to apply suction force) on the component 200*b*. The particular arrangement of the openings 134, 136 with the respective solid portion 206 and openings 208 of the component 200*b* may achieve certain advantages. For example, this particular arrangement may distribute a suction force across the component 200*b* (e.g. across the solid portion 206 and openings 208) based on the generated air flow 142. In this example embodiment, the wider opening 136 is aligned with the openings 208 and the narrower openings 134 are aligned with the solid portion 206 since a larger air flow is necessary across the openings 208 relative to the solid portion 206 in order to achieve an equalized suction force across the component 200*b*.

Third Gripper Head Design

Figure 5A:
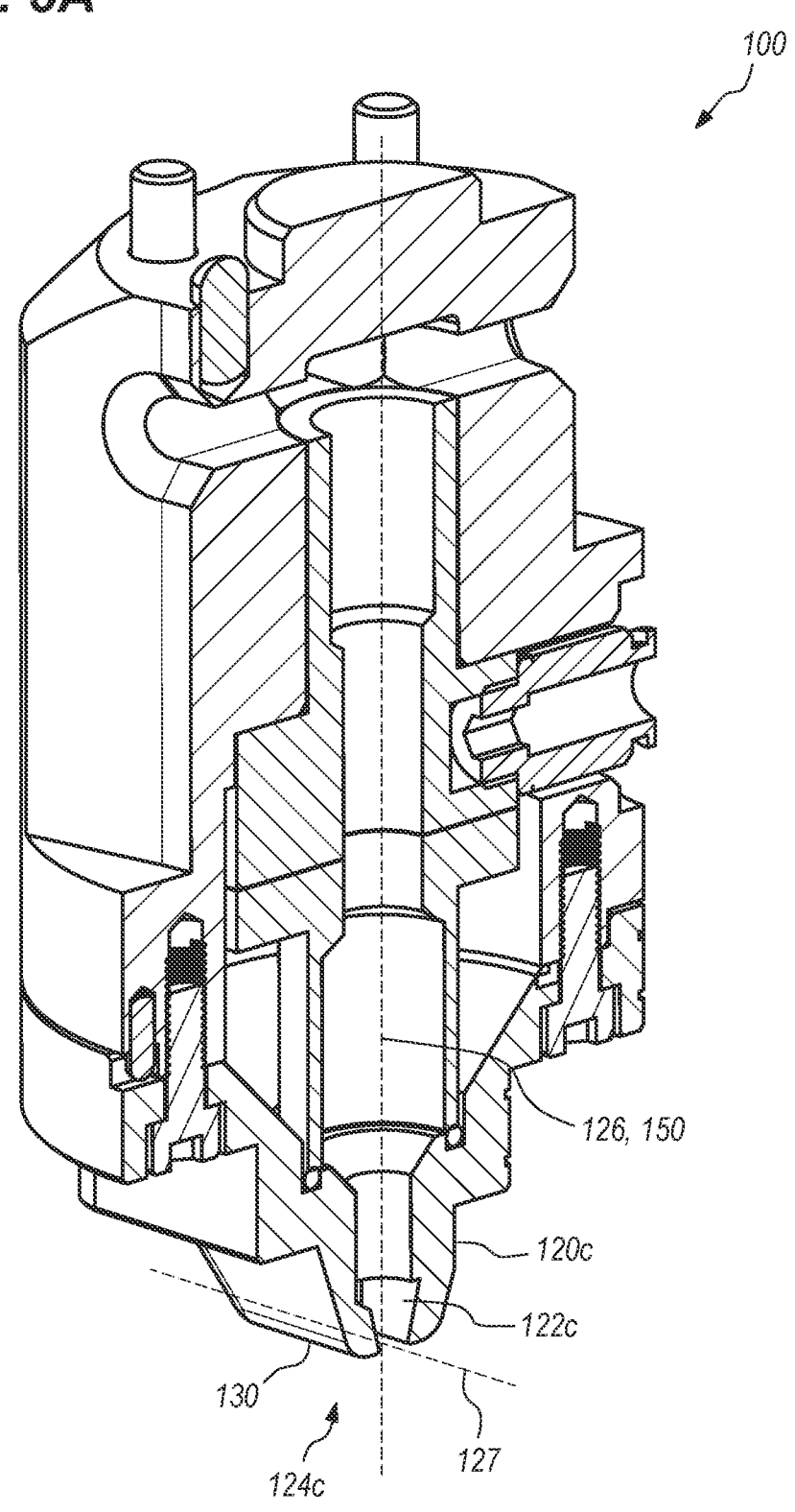
FIG. 5A is an example according to various embodiments illustrating a cross-sectional side view of a gripping apparatus including a gripper head to releasably hold a component.
Figure 5B:
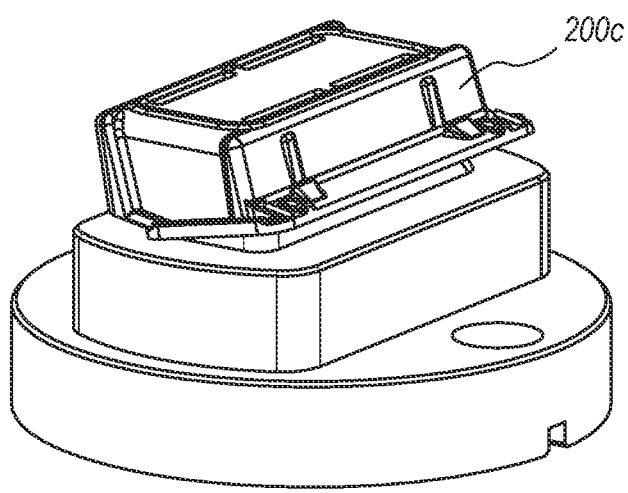
FIGS. 5B through 5C is an example according to various embodiments illustrating perspective views of the gripper head of FIG. 5A to releasably hold the component.
Figure 5C:
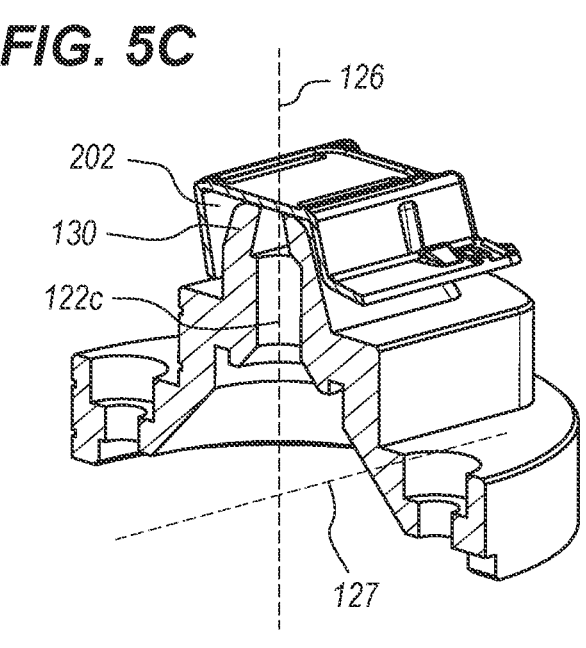

A third embodiment of a gripper head 120*c* and associated component 200*c* located and removably held by the gripper head 120*c* will now be discussed and are depicted in FIGS. 5A through 5C. In an embodiment, the component 200*c* is another possible example of a shaving razor cartridge cover.

FIG. 5A is an example according to various embodiments illustrating a cross-sectional side view of the gripping apparatus 100 including the gripper head 120*c* to releasably hold the component 200*c*. FIGS. 5B through 5C is an example according to various embodiments illustrating perspective views of the gripper head 120*c* of FIG. 5A to releasably hold the component 200*c*. As shown in FIG. 5A, the gripper head 120*c* includes a single opening 122*c*. In one embodiment, unlike the single opening 122*a* of FIG. 3A (non-tapered width), the width of the single opening 122*c* is tapered over the gripper head 120*c*.

Additionally, as shown in FIG. 5A, in some embodiments the gripper head 120*c* and the single opening 122*c* are elongated along a transverse axis 127 of the gripper head 120*c* that is orthogonal to the longitudinal axis 126. In an embodiment, the elongated single opening 122*c* is dimensioned to distribute a suction force across the component 200*c* along the transverse axis 127 based on the generated air flow 142. The nest 124*c* of the gripper head 120*c* is a profiled surface 130 that is elongated along the traverse axis 127. The profiled surface 130 is dimensioned along the transverse axis 127 based on a corresponding inner diameter of a recess 202 of the component 200*c* along the transverse axis 127. Additionally, as shown in FIG. 5C, the profiled surface 130 is configured to be received within the recess 202 defined by the component 200*c*. In an example embodiment, an outer diameter of the profiled surface 130 along the transverse axis 127 is less than an inner diameter of the recess 202 along the transverse axis 127 but is sufficiently close to the inner diameter of the recess 202 in order to achieve a close fit of the profiled surface 130 within the recess 202.

The gripper head 120*c* was designed with these particular features (e.g. elongated opening 122*c* along the transverse axis 127 and/or elongated profiled surface 130 along the transverse axis 127) to achieve one or more advantages with respect to locating and removably holding the component

200*c*. The single opening 122*c* and the profiled surface 130 may be shaped and dimensioned along the transverse axis 127 to advantageously enhance the fit of the profile surface 130 within the recess 202 and further distributes the suction force on the component 200*c* across the transverse axis 127.

Gripper Head Kit

Although the previously discussed embodiments disclose the gripping apparatus 100 that includes the body 102, the present invention is not limited to these embodiments and in some embodiments includes a kit is provided that can be used with the gripping apparatus 100 in order to secure different gripper heads 120 to the body 102 in order to move different types of components 200 from the first location to the second location. This advantageously permits the same gripping apparatus 100 and body 102 that can otherwise only transport one type of component to be converted into an improved gripping apparatus that can be used to transport multiple different types of components by securing different gripper heads to the body 102 of the gripping apparatus 100.

Figure 6:
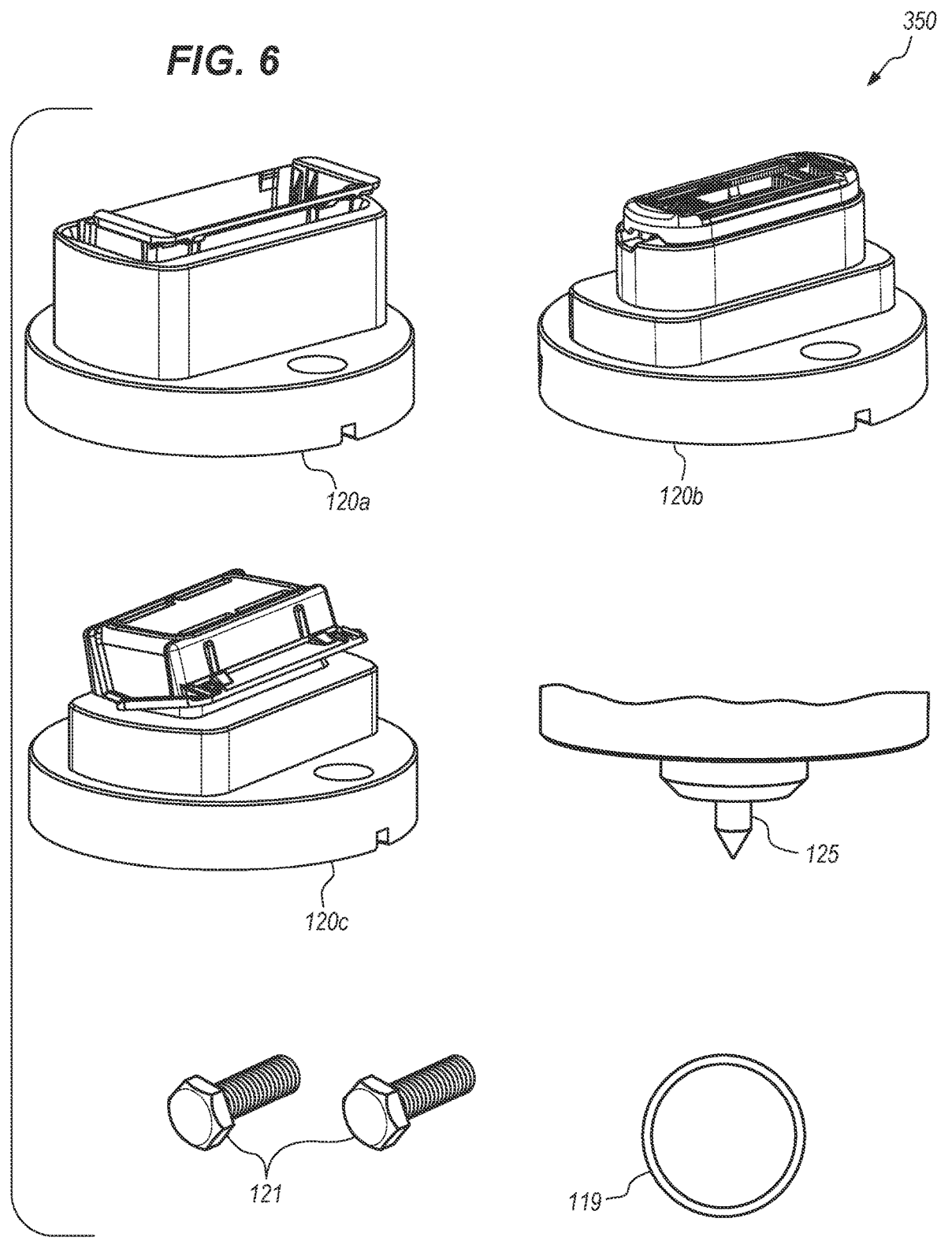

FIG. 6 is an example according to various embodiments illustrating a kit 350 for the gripping apparatus 100 including multiple gripper heads 120*a*, 120*b*, 120*c* used to transport multiple components 200*a*, 200*b*, 200*c* from a first location to a second location. Although three gripper heads 120*a*, 120*b*, 120*c* are depicted in FIG. 6, the kit 350 is not limited to including one or more of these gripper heads 120*a*, 120*b*, 120*c* and includes other gripper heads with a different design that can be similarly employed to locate and releasably hold different components other than the components 200*a*, 200*b*, 200*c*.

In some embodiments, as shown in FIG. 6 the kit 350 includes a calibration tip 125. In these embodiments, the calibration tip 125 can be secured to the second end 110 of the body 102 in a similar manner as the gripper heads 120 (e.g. passing bolts 121 through aligned openings in the calibration tip 125 and the second end 110 of the body 102). This calibration tip 125 can then be used to calibrate a position of the system in which the gripping apparatus 100 is employed. In one example embodiment, FIG. 1C depicts a pair of calibration locations 318*a*, 318*b* on the second conveyor line 310*b*. In order to calibrate the location of the gripping apparatus 100 within the automated system 300 the calibration tip 125 is secured to the second end 110 of the body 102 after which the body 102 is moved by the component 302 of the automated system 300 until the calibration tip 125 is at each calibration location 318*a*, 318*b*. A controller (not shown) of the automated system 300 then stores the position of the calibration tip 125 in a memory which is then used in positioning the body 102 with the attached gripper head 120 at one or more other locations on the second conveyor line 310*b*.

As further shown in FIG. 6, in some embodiments the kit 350 includes one or more components to facilitate removing a first gripper head 120*a* from the second end 110 of the body 102 and securing a second gripper head 120*b* (different from the first gripper head 120*a*) to the second end 110 of the body 102. This advantageously facilities the same gripping apparatus 100 being used to transport one or more components 200*a* (with the gripper head 120*a*) from the first location to the second location and after which being used to transport one or more components 200*b* (with the gripper head 120*b*) from the first location to the second location. Although the gripper heads 120*a*, 120*b* and components 200*a*, 200*b* are discussed in this embodiment, the kit is not limited to these gripper heads and components and thus can facilitate the removal and replacement of any two different gripper heads in order to facilitate the transport of any two different components which can be located and releasably held by the two different gripper heads.

In some embodiments, the components used to facilitate the removal and replacement of gripper heads 120 from the second end 110 of the body 102 include the O-ring 119 and the bolts 121. In these embodiments, the first gripper head 120*a* is removed by removing the bolts 121 from the second end 110 of the body 102 and removing the O-ring 119 from the recess 118 in the first gripper head 120*a*. The O-ring 119 is then positioned in the recess 118 of the second gripper head 120*b*. The bolt openings of the second gripper head 120*b* are then aligned with the bolt openings in the second end 110 of the body 102 and the bolts 121 are passed through the aligned openings to secure the second gripper head 120*b* to the second end 110 of the body 102. These steps can be repeated in order to replace any gripper head with another gripper head, and thus facilitates the versatility of the gripping apparatus 100 being used to transport multiple different types of components 200. However, although the O-ring 119 and bolts 121 are depicted in FIG. 6, the kit 350 is not limited to these particular components for removing and replacing the gripper head and in other embodiments includes other components or means (e.g. clips, magnetic or an air vacuum) for removing and replacing the gripper heads.

Method for Transporting Components using Multiple Gripper Heads

A method is now presented where the gripper apparatus 100 and the one or more gripper heads 120 are used to transport one or more components 200 from the first location to the second location. FIG. 7 is an example according to various embodiments illustrating a flowchart of a method 400 for transporting one or more components 200 using the one or more gripper heads 120 of the kit 350 of FIG. 6. In one embodiment, the method 400 is used to transport one or more components from the first conveyor line 310*a* to the second conveyor line 310*b* (FIG. 1B). Although the flow diagram of FIG. 7 is depicted as integral steps in a particular order for purposes of illustration, in other embodiments, one or more steps, or portions thereof, are performed in a different order, or overlapping in time, in series or in parallel, or are omitted, or one or more additional steps are added, or the method is changed in some combination of ways.

The method 400 begins at step 401 where the gripper head 120 is selected to transport the one or more components 200. In one embodiment, in step 401 one or more characteristics of the components 200 are determined and are used to select the gripper head 120. In one example embodiment, in step 401 the gripper head 120*a* is selected in order to transport one or more components 200*a*. In another example embodiment, in step 401 the gripper head 120*b* is selected in order to transport one or more components 200*b*. In one example embodiment, in step 401 the gripper head 120*c* is selected in order to transport one or more components 200*c*. However, step 401 is not limited to selecting among the gripper heads 120*a*, 120*b*, 120*c* to transport the components 200*a*, 200*b*, 200*c*, and includes other gripper heads 120 that are designed in a similar manner as the gripper heads 120*a*, 120*b*, 120*c* to transport components 200 other than the components 200*a*, 200*b*, 200*c*.

The method 400 then proceeds to step 402 where the gripper head 120 selected in step 401 is secured to the second end 110 of the body 102 of the gripper apparatus 100. In one embodiment, in step 402 the O-ring 119 is positioned in the recess 118 of the gripper head 120. The bolt openings in the gripper head 120 are then aligned with corresponding bolt openings in the second end 110 of the body 102. The bolts 121 are then passed through the aligned bolt openings to secure the gripper head 120 to the second end 110 of the body 102. It was recognized that step 402 secures the gripper head 120 to the second end 110 of the body 102 to form a vacuum seal between the gripper head 120 and the second end 110 such that air does not pass between the gripper head 120 and the second end 110 of the body 102. In other embodiments, other means are employed in step 402 to secure the gripper head 120 to the second end 110 of the body 102 (e.g. clips, magnets or a vacuum source). In one example embodiment, in step 402 the gripper head 120*a* with the single opening 122*a* and the nest 124*a* is attached to the second end 110 of the body 102.

The method 400 then proceeds to step 404 where the air flow 142 is generated through the inlet 144 of the air conveyor 140 and out through the exhaust 106 at the first end 108 of the body 102. In some embodiments, in step 404 a compressed air source (not shown) supplies the air flow 142 through the hose 301 (FIG. 1A) to the inlet 144. In some embodiments, in step 404 a pressure of the compressed air is selected (e.g. between 4 bar, 5 bar and 6 bar) that is supplied to the inlet 144 from the compressed air source. In these embodiments, the value of the pressure is selected based on one or more characteristics of the component 200.

The method 400 then proceeds to step 406 where suction force is applied to the component 200 through the gripper head 120 so that the nest 124 of the gripper head 120 locates and releasably holds the component 200. In some embodiments, step 406 is performed to the component(s) 200 located at the first location (e.g. first conveyor line 310*a*). This suction force is applied through the gripper head 120 due to the generated air flow 142 at step 404. In an example embodiment, where the gripper head 120*a* is attached to the second end 110 of the body 102 in step 402, in step 406 suction is applied to the component 200*a* via the single opening 122*a* to releasably hold the component 200*a* with the gripper head 120*a* at the first location. Additionally, in this example embodiment, the applying step 406 includes the male portion 204 of the component 200*a* being received within the profiled pocket 132 of the gripper head 120*a* to releasably hold the component 200*a* with the gripper head 120*a*.

In another example embodiment, where the second gripper head 120*b* is attached to the second end 110 of the body 102 in step 402, in step 406 suction is applied to the component 200*b* via the angled openings 134 and the single opening 136 to releasably hold the second component 200*b* based on the generating step 404. Additionally, in this example embodiment, the angled openings 134 are aligned with the solid portion 206 of the component 200*b* and the single opening 136 is oriented at the openings 208 of the component 200*b* such that the applying step 406 distributes a suction force across the solid portion 206 and openings 208 of the component 200*b* based on the generating step 404.

In yet another example embodiment, when the gripper head 120*c* is attached to the second end 110 of the body 102, the elongated single opening 122*c* is dimensioned such that the applying step 406 distributes a suction force across the component 200*c* along the transverse axis 127 based on the generating 404 step. Additionally, in this example embodiment, the applying step 406 causes the profiled surface 130 of the component 120*c* to be received within the recess 202 defined by the component 200*c*.

The method 400 then proceeds to step 408 where the component 200 releasably held by the gripper head 120 at the first location in step 406 is transported to a second location. In one embodiment, where the gripping apparatus 100 is secured to the component 302 of the automated system 300, in step 408 the component 302 of the automated system 300 is moved in one or more directions (e.g. along one or more axes 304a, 304b, 304c and/or in one or more rotational directions 305a, 305b, 305c) until the component 200 is at the second location (e.g. second conveyor line 310b). In this example embodiment, in step 408 the component 302 is moved until the component 200 is at a particular location at the second location (e.g. along axis 312 of the second conveyor line 310b) so that the components 200 are arranged with a particular arrangement at the second location (e.g. ordered arrangement 321 along the axis 312).

The method 400 then moves to block 310 where it is determined whether more components 200 of the same type moved in step 308 are to be moved. If the result of this determination is in the affirmative, the method 400 proceeds back to step 404 and steps 404 through 408 are repeated for another component 200 of the same type moved in step 408. This is repeated until all of the components 200 of the same type are moved from the first location to the second location. If the determination is in the negative, the method 400 proceeds to block 412.

In block 412, the method 400 determines whether additional components 200 other than the component 200 moved in the previous iteration of step 408 are to be moved. If the result of this determination is in the affirmative, the method 400 moves to step 413. If the result of this this determination is in the negative, the method 400 ends since no more components 200 are to be moved from the first location to the second location.

In step 413, the method 400 removes the gripper head 120 that is secured to the second end 110 of the body 102. In an embodiment, step 413 is performed after all components 200 to be moved by the gripper head 120 have been moved from the first location to the second location and more components 200 of a different type still need to be transported from the first location to the second location. For purposes of description, step 413 will be discussed with respect to removing the gripper head 120a which is performed after transporting the components 200a from the first location to the second location. In this example embodiment, step 413 is performed after all of the components 200a are moved with the gripper head 120a. In one embodiment, in step 413 the bolts 121 are removed from the second end 110 of the body 102 and the gripper head 120a is removed from the second end 110. The O-ring 119 is also removed from the recess 118 of the gripper head 120a.

After step 413 the method 400 proceeds back to steps 401 and 402 where the gripper head 120 is replaced with a different gripper head 120 in order to move components 200 that are different from the components 200 moved by the gripper head 120 removed in step 413. In the above example embodiment, after removing the gripper head 120a in step 413 the gripper head 120b is selected in step 401 due to components 200b which need to be transported from the first location to the second location. In this example embodiment, in step 402 the O-ring 119 is inserted in the recess 118 of the gripper head 120b. The gripper head 120b is then secured to the second end 110 of the body 102 using the bolts 121. Although steps 401 and 402 are discussed in the context of the example of replacing the gripper head 120a with the gripper head 120b, these steps can be similarly performed when replacing any gripper head with a different gripper head. After the gripper head 120b is attached in the second iteration of step 402, steps 404 through 408 are performed to transport the components 200b from the first location to the second location.

System and Method for 3D Printing Gripper Heads for Transporting Components

Figure 8:
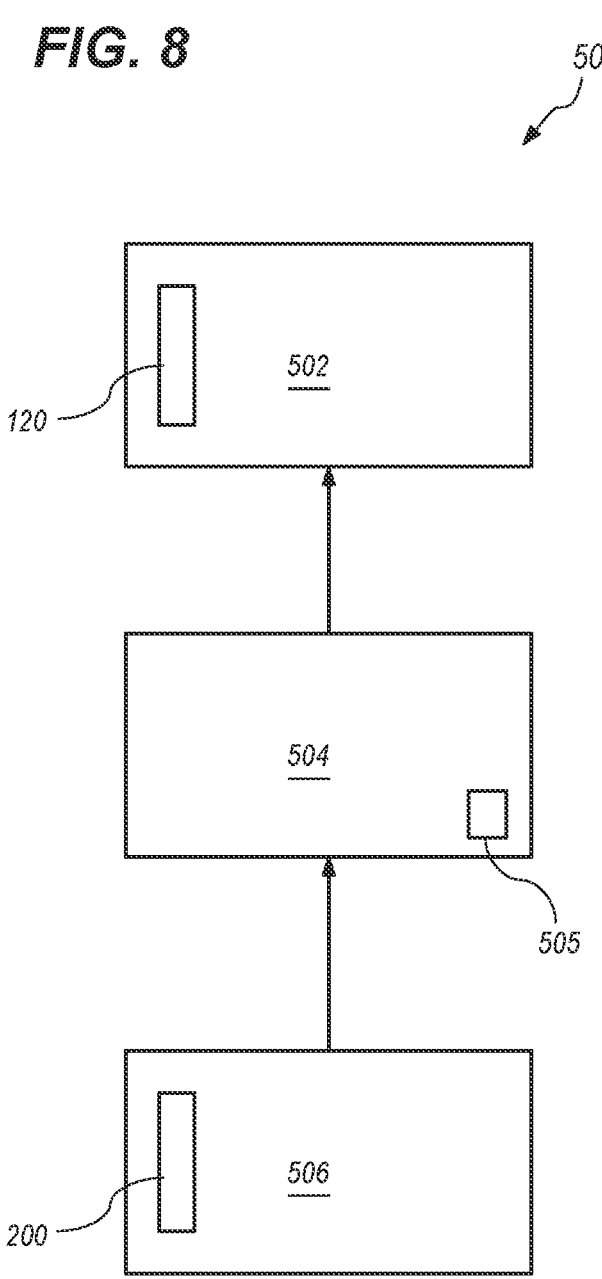
FIG. 8 is an example according to various embodiments illustrating a system for 3D printing one or more gripper heads of the kit of FIG. 6.

A system and method will now be discussed that is used to 3D print one or more of the gripper heads 120 that are used to transport the one or more components 200. FIG. 8 is an example according to various embodiments illustrating a system 500 for 3D printing one or more gripper heads 120 of the kit 350 of FIG. 6. In an embodiment, the system 500 includes a 3D printer 502 that is used to 3D print one or more of the components 200. The system 500 also includes a controller 504 with a memory 505 that is communicatively coupled to the 3D printer 502. In some embodiments, the system 500 also includes a scanner 506 is used to scan one or more of the components 200. The scanner 506 is communicatively coupled to the controller 504 and is configured to transmit scan data (e.g. CAD data) of the component 200 to the controller 504. The scan data indicates the geometry of the component 200 which is used by the controller 504 to obtain data (e.g. CAD data) indicating a geometry of a gripper head 120 that can be used to locate and releasably hold the component 200.

In an example embodiment, a correspondence between the geometry data of the component 200 and the geometry data of the gripper head 120 is stored in the memory 505 of the controller 504. In this example embodiment, the controller 504 determines the geometry data of the gripper head 120 to be 3D printed from the memory 505 based on the geometry data of the component 200 that is received from the scanner 506 (or from another remote data source). In some embodiments, the controller 504 transmits this data indicating the geometry of the gripper head 120 to the 3D printer 502 which then 3D prints the gripper head 120 to be used in transporting the component 200. In other embodiments, the data indicating the geometry of the component 200 and/or the gripper head 120 is downloaded to the memory 505 of the controller 504 from a remote source. In these embodiments, the scanner 506 is not used since the data indicating the geometry of the gripper head 120 is downloaded from a remote source other than the scanner 506.

FIG. 9 is an example according to various embodiments illustrating a flowchart of a method 550 for forming the one or more gripper heads 120 using the system 500 of FIG. 8. In an embodiment, the method 550 includes obtaining 552 3D data (e.g. CAD data) based on a geometry of a component 200. As previously discussed, in some embodiments step 552 is performed using the scanner 506 which scans a component 200 to be transported by the gripping apparatus 100. The scanner 506 scans the component 200 to obtain data (e.g. CAD data) indicating a geometry of the component 200. This data is then transmitted from the scanner 506 to the controller 504 which determines corresponding data indicating a geometry of a gripper head 120 to be used to transport the component 200. In one example embodiment, the memory 505 of the controller 504 stores a correspondence between the geometry data of the component 200 and the geometry data of the gripper head 120 to be used to transport the component 200. Thus, the controller 504 uses the memory 505 to determine the geometry data of the gripper head 120 based on the received geometry data of the component 200.

In some embodiments, the 3D data obtained in step 502 indicates solid regions and openings of the component 200. In one embodiment, for the component 200b the 3D data obtained in step 502 indicates the solid regions 206 and the openings 208 in the component 200*b*. The controller 504 uses this obtained 3D data to determine the data indicating the geometry of the gripper head 120*b* (e.g. with the angled openings 134 and single opening 136) to locate and releasably hold the component 200*b*. In one example embodiment, the controller 504 determines the data indicating the geometry of the gripper head 120*b* by positioning the angled openings 134 to be aligned with the openings 208 and the single opening 136 to be aligned with the solid portions 206 of the component 200*b*. As previously discussed, this geometry of the gripper head 120*b* achieves notable advantages, such as distributing the suction force across the component 200*b*.

In step 554, the method 550 includes a step of forming the gripper head 120 based on the 3D data obtained in step 552. In an embodiment, in step 554 the 3D printer 502 forms the gripper head 120 based on the geometry data of the gripper head 120 received from the controller 504. In one embodiment, in step 554 the 3D printer 502 forms the nest 124 and the one or more openings 122 in the gripper head 120. It was recognized that the 3D printing advantageously permits the gripper head 120 to be formed with intricate curvatures and openings (e.g. angled opening 134 in FIG. 4D) that would not be possible with conventional manufacturing methods (e.g. injection molding, machining, etc.). In one example embodiment, in step 554 the 3D printer 502 forms the nest 124 and the one or more openings 122 in the gripper head 120 to locate and releasably hold the component 200 based on suction being applied through the one or more openings 122.

In one example embodiment, the 3D printing in step 554 is performed using 3D printable material (e.g. one of carbon fiber, metal, polymer and impregnated polymer material). Additionally, in another example embodiment, the 3D printing in step 554 is performed such that the 3D printed gripper head 120 has a weight in a range between 0.1 kg and 0.5 kg.

The formation of the different gripper head designs 120*a*, 120*b*, 120*c* will now be discussed based on the method 550 of FIG. 9. In one example embodiment of the gripper head 120*a*, the obtaining step 502 includes obtaining 3D data indicating the geometry of the component 200*a*. In one embodiment the obtaining step 502 includes identifying the male portion 204 of the component 200*a*. In this embodiment, the forming step 504 includes forming the nest 124 of the gripper head 120*a* with the profiled pocket 132 in communication with the opening 122*a* such that the male portion 204 of the component 200*a* is received within the profiled pocket 132 based on suction applied through the opening 122*a*. The forming step 504 also includes forming the single opening 122*a* in the gripper head 120*a* that is parallel to the longitudinal axis 126 of the gripper head 120*a* so that the gripper head 120*a* is configured to releasably hold the component 200*a* based on suction applied through the opening 122*a*. In another embodiment, the forming step 504 includes forming the opening 122*a* with a fixed width over the gripper head 120*a*.

In one example embodiment of the gripper head 120*b*, the obtaining step 502 includes obtaining 3D data indicating the geometry of the component 200*b*. In one example embodiment, the obtaining step 502 includes obtaining 3D data that indicates the solid portion 206 and openings 208 of the component 200*b*. In this example embodiment, the forming step 504 includes orienting the multiple angled openings 134 such that they are aligned with the solid portion 206 of the component 200*b* and orienting the single opening 136 such that it is aligned with the openings 208 of the component

200*b* to distribute a suction force across the solid portion and openings 206, 208 of the component 200*b* upon applying suction via the multiple angled openings 134 and the single opening 136. In yet another example embodiment, step 504 includes sizing the multiple angled openings 134 with the first width 135 and sizing the single opening 136 with the second width 137 that is different (e.g. greater than) from the first width 135. In some embodiments, the forming step 504 includes forming the single opening 136 in the gripper head 120*b* that is parallel to the longitudinal axis 126 such that the component 200*b* is releasably held by the gripper head 120*b* upon applying suction via the single opening 136 and the multiple angled openings 134. Additionally, the forming step 504 involves forming the recess 139 in the gripper head 120*b* to receive the male portion 205 of the component 200*b*.

In one example embodiment of the gripper head 120*c*, the obtaining step 502 includes obtaining 3D data indicating the geometry of the component 200*c*. In some embodiments, the obtaining step 502 includes obtaining 3D data that indicates the recess 202 defined by the component 200*c*. In an embodiment, the forming step 504 includes forming the profiled surface 130 in the gripper head 120*c* that is elongated along the transverse axis 127 and is in communication with the opening 122*c* so that the profiled surface 130 is received within the recess 202 of the component 200*c* based on suction applied through the opening 122*c*. In another embodiment, the forming step 504 then includes forming the opening 122*c* including tapering a width of the opening 122*c* over the gripper head 120*c*. Additionally, in some embodiments, the forming step 504 includes elongating the opening 122*c* along the transverse axis 127 of the gripper head 120*c* that is orthogonal to the longitudinal axis 126. In these embodiments, the forming step 504 further includes dimensioning the elongated opening 122*c* such that the suction applied through the elongated opening 122*c* is distributed across the component 200*c* along the transverse axis 127.

In some embodiments, after a gripper head is formed in step 554, in step 556 a determination is made of whether more components are to be transported other than the component for which the gripper head 120 was formed in step 554. In an embodiment, in step 556 a determination is made whether a different type of component 200 needs to be transported other than the component 200 for which the gripper head 120 was formed in the previous iteration of steps 552 and 554. If this determination is in the affirmative, then the method 550 proceeds back to step 552. If the determination is in the negative, the method 550 ends.

Further Definitions and Cross-References

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present disclosure have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A gripping apparatus comprising:
a body defining a chamber and including an exhaust at a first end of the body;
a gripper head configured to be attached to a second end of the body opposite to the first end, wherein the gripper head defines one or more openings and a nest having a profile configured to locate and releasably hold a component based on an air flow generated within the chamber and discharged through the exhaust; and
an air conveyor positioned within the chamber, wherein the air conveyor is configured to generate the air flow through an inlet and out through the exhaust, wherein the air conveyor defines a central bore and an exhaust port and wherein the inlet includes an inlet port with a nozzle in communication with the central bore and the exhaust port.

2. The gripping apparatus of claim 1, wherein the first end of the body includes an attachment mechanism configured to secure the first end to a component of an automated system configured to move the gripping apparatus in one or more dimensions.

3. The gripping apparatus of claim 1, wherein the second end of the body is configured to removably attach to the gripper head using one or more of bolts, clips, magnets or an air vacuum.

4. The gripping apparatus of claim 1, wherein the nest is rigid.

5. The gripping apparatus of claim 1, wherein the gripper head comprises an O-ring that is configured to form a vacuum seal with the second end of the body.

6. The gripping apparatus of claim 1, wherein the nozzle and the inlet port are oriented orthogonal to a longitudinal axis of the air conveyor defined by the central bore.

7. The gripping apparatus of claim 1, wherein the nozzle has a diameter that is less than a diameter of the central bore.

8. The gripping apparatus of claim 1, wherein the body is configured to securely surround and encase the air conveyor within the chamber.

9. The gripping apparatus of claim 1, wherein the exhaust port of the air conveyor is positioned at one end of the chamber adjacent the first end of the body such that the exhaust at the first end of the body is in communication with the exhaust port and the central bore of the air conveyor and such that the air flow generated within the central bore is discharged through the exhaust at the first end of the body.

10. The gripping apparatus of claim 1, wherein the exhaust at the first end of the body defines a plurality of exhaust openings that are spaced apart along an outer surface of the first end of the body such that the generated air flow is dissipated through the plurality of exhaust openings.

11. The gripping apparatus of claim 1, wherein the gripper head comprises a plurality of gripper heads including:
a first gripper head having one or more first openings and a first nest that is configured to locate and releasably hold a first component when attached to the second end of the body; and
a second gripper head having one or more second openings that is different from the one or more first openings and a second nest that is different from the first nest and wherein the second gripper head is configured to locate and releasably hold a second component that is different from the first component when attached to the second end of the body.

12. The gripping apparatus of claim 11, further comprising the first component and the second component.

13. The gripping apparatus of claim 1, wherein the gripper head defines a single opening that is parallel to a longitudinal axis of the gripper head, wherein the single opening and the nest are configured to locate and releasably hold the component based on the generated air flow.

14. The gripping apparatus of claim 13, wherein a width of the single opening is tapered over the gripper head.

15. The gripping apparatus of claim 13, wherein a width of the single opening is non-tapered over the gripper head (120a).

16. The gripping apparatus of claim 13, wherein the single opening is elongated along a transverse axis of the gripper head that is orthogonal to the longitudinal axis.

17. The gripping apparatus of claim 16, wherein said elongated single opening is dimensioned to distribute a suction force across the component along the transverse axis based on the generated air flow.

18. The gripping apparatus of claim 13, wherein the nest of the gripper head is a profiled surface that is elongated along a traverse axis that is orthogonal to the longitudinal axis and is in communication with the single opening, wherein the profiled surface is configured to be received within a recess defined by the component.

19. The gripping apparatus of claim 13, wherein the single opening is circular in shape.

20. The gripping apparatus of claim 13, wherein the nest of the gripper head includes a profiled pocket in communication with the single opening, wherein the profiled pocket is configured to receive a portion of the component releasably engaged by the gripper head.

* * * * *